Feb. 14, 1950 C. K. GRAVLEY 2,497,666

ELECTRODE FOR PIEZOELECTRIC CRYSTALS

Filed May 4, 1945

INVENTOR.
CHARLES K. GRAVLEY
BY
Elmer J. Hyde
ATTORNEY

Patented Feb. 14, 1950 2,497,666

UNITED STATES PATENT OFFICE 2,497,666

ELECTRODE FOR PIEZOELECTRIC CRYSTALS

Charles K. Gravley, Cleveland Heights, Ohio, assignor to The Brush Development Company, Cleveland, Ohio, a corporation of Ohio Application May 4, 1945, Serial No. 591,900

5 Claims. (Cl. 171—327)

My invention pertains to the evaporation of metals, and it also pertains to electrodes for piezoelectric crystal elements and to the method of applying electrodes to said elements.

An object of my invention is to provide a method of evaporating metals onto a base to improve the adhesion therebetween.

An object of my invention is to provide for a piezoelectric crystal element a thin electrode which resists oxidization and corrosion.

Another object of my invention is to provide an electrode which is in good electrical and intimate physical contact with a piezoelectric crystal element.

It is also an object of my invention to provide an electrode which exhibits very little surface or contact resistance to a lead connected to it.

A further object of my invention is to provide for a piezoelectric crystal element a composite metallic electrode which adheres well and which exhibits low contact resistance with an associated lead.

Still another object of my invention is to provide a method of applying a composite metallic electrode to a piezoelectric crystal element.

And another object of my invention is to provide an evaporated electrode which will adhere to a base such as a piezoelectric crystal and which will have low electrical contact resistance with an associated lead.

Other objects and a fuller understanding of my invention may be had by referring to the following description, claims and drawings wherein:

Figures 1, 2, 3, 4, 5:
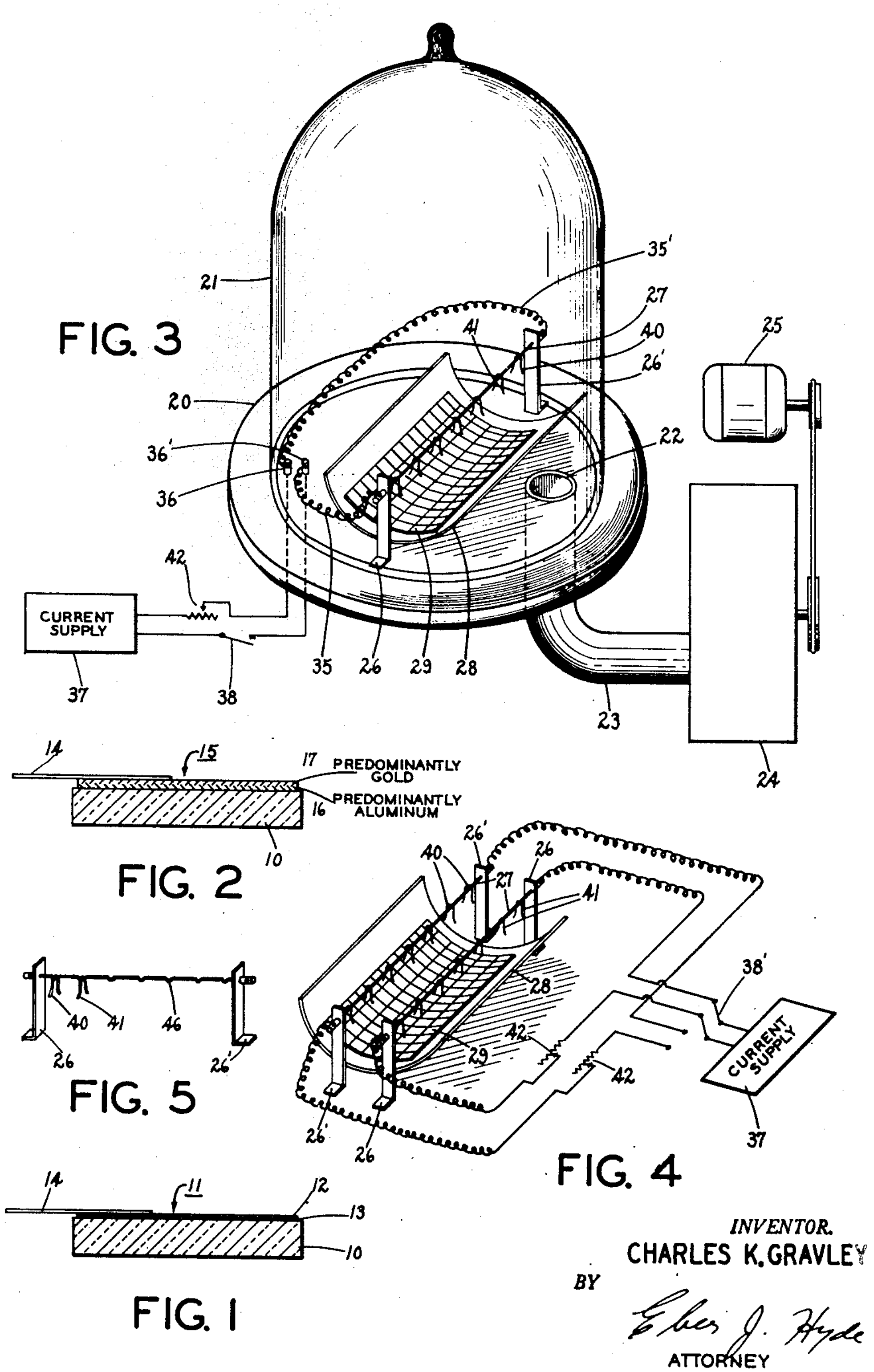
Figure 1 is a cross-sectional view through an electroded crystal, showing one form of composite electrode.
Figure 2 is a similar view showing another form of electrode.
Figure 3 is a view of apparatus suitable for electroding a crystal.
Figure 4 is a view of a portion of apparatus for electroding a crystal.
Figure 5 illustrates a modified form of a portion of the device for electroding crystals.

In Figure 1 there is shown a piezoelectric crystal element 10 which has a composite electrode 11 comprised of two layers of metal 12 and 13. With respect to the thickness of the crystal 10 the electrode 11 has been exaggerated, as electrode 11 has a thickness of only a few millionths of an inch. The layer 13 is in intimate electrical contact with the surface of the crystal 10 and adheres to it, and the layer 12 is in intimate electrical contact with the metal layer 13 and adheres to it, the two layers forming the composite electrode 11 to which a lead 14 is connected.

I have found that aluminum is a very good metal for the layer 13 as it sticks to the crystalline material very well and it is a good electrical conductor. It does not, however, by itself make a good electrode as its outer surface oxidizes upon exposure to air establishing a thin surface film having high electrical contact resistance when in engagement with an electrical lead. Therefore, when a lead such as lead 14 is in contact with this aluminum electrode heat is generated as current flows through this high resistance film, and as few piezoelectric crystals can withstand heat the unit is detrimentally affected. Also, power is lost as is indicated by the heat generated.

Gold, by itself, while it satisfies all of the electrical requirements for a good electrode such as good conductivity and low contact resistance, will not adhere to the crystal surface with sufficient tenacity. Even roughening of the crystal surface by sandpaper or sand blasting prior to the application of the gold electrode does not assure that the electrode will stick.

In my invention I apply a first layer 13 of aluminum in contact with the face of the crystal to assure a good mechanical or physical connection, and I apply a second layer 12 of gold to the aluminum. The gold adheres well to the aluminum, under certain hereinafter described conditions, and the contact resistance to a subsequently applied electrical lead is low. The aluminum layer may be substantially coextensive with the crystal face or it may be somewhat smaller in area due to unelectroded margins around the face, and the gold layer may be coextensive with the aluminum layer or it may be applied only over the limited area where the lead extension connects with the electrode. It is also probable that to a certain extent the gold prevents the aluminum from oxidizing, thereby reducing the amount of aluminum oxide present. This is advantageous as aluminum oxide has a very high resistance to the flow of electricity.

Figure 1 illustrates two distinct and separate layers 13 and 12 on the crystal. However, it is possible, such as by evaporating the electrodes onto the crystal face, to form a composite electrode which is not two distinct layers. This is shown in Figure 2 where the crystal is identified by reference character 10 and the composite electrode by the reference character 15. The electrode 15 is comprised of a "layer" 16 next to the surface of the crystal 10 and a "layer" 17 in contact with the "layer" 16 and forming the outside surface of the composite electrode 15. The "layer" 16 may be predominantly aluminum and the "layer" 17 predominantly gold, the intermediate zone being a mixture or alloy of the two metals.

In order to achieve the best results, the first layer is applied to the crystal in a vacuum and the second layer is applied without breaking the vacuum. It is to be understood that it does not have to be a perfect vacuum but a substantial vacuum such, for example, as $5 \times 10^{-4}$ mm. Hg should be obtained. I have found if the vacuum is broken between applying the aluminum and applying the gold that the adhesion between the aluminum and gold is not as good as when the vacuum is not broken.

Figure 3 illustrates a device for obtaining the proper vacuum and for evaporating the composite electrode onto a face of each of a number of crystal plates. The device comprises a flat base plate 20 which may rest on a table and a bell jar 21. Between the lower edge of the bell jar and the surface of the plate there may be petroleum jelly or a rubber gasket for establishing as nearly a perfect seal as possible. An opening 22 is provided in the base 20 and a pipe 23 extends from the opening to a vacuum pump 24 which is driven by motor 25 to establish the vacuum within the bell jar 21.

Within the confines of the bell jar and mounted on the base plate 20 there are two spaced uprights 26, 26′ for supporting a filament 27 between them. Beneath the filament 27 and spaced 3 to 4 inches from it is a curved support 28 for holding a plurality of crystal plates 29. The curved support 28 may have legs (not shown) on its underneath surface to prevent it from rocking, or other means may be utilized. The supports 26 are made of an electrically insulating material, or may otherwise be insulated from the base plate 20 which preferably is made of metal. Lead wires 35, 35′ are connected to the opposite ends of the filament 27 and to two spaced terminals 36, 36′ which extend through the base 20 and are electrically insulated therefrom.

The terminals 36, 36′ are electrically connected to an alternating or direct current supply 37 and a switch 38 is provided in the circuit.

The filament 27 preferably is of 40 mil tungsten wire, and suspended on it are a number of bent wires of metal to be evaporated. These bent wires are spaced about 2 inches apart and alternately are of gold 40 and aluminum 41. The gold wires should be about ½ inch long and 30 mil in diameter and the aluminum should be about ½ inch long and 20 mil in diameter.

With the device set up as described and sufficient vacuum established, the switch 38 is closed causing the filament 27 to heat and causing, by conduction, the gold and aluminum wires 40, 41 to heat. The current supply may be on the order of 6 to 15 amperes, sufficient to heat the gold and aluminum to their vaporizing temperatures in about 1 second.

Aluminum has a lower vaporizing temperature than gold so it will vaporize and deposit on the exposed faces of the crystal plates before the gold vaporizes and deposits. Thus there will first be formed on the crystal plates a thin layer which is predominantly aluminum and then a thin layer which is predominantly gold, as is shown in Figure 2. There will, however, probably be an intermediate zone which is a mixture or alloy of the two metals. So long as the outside portion of the electrode is predominantly gold the outside surface of the electrode will not have too high contact resistance, and so long as the first deposited portion of the composite electrode is predominantly aluminum a good mechanical bond between the crystal and the electrode will be obtained. The rate at which the temperatures of the gold and aluminum wires 40, 41 are raised will determine the extent of the intermediate zone. If the temperature is raised slowly beyond the vaporization temperature of the aluminum and several seconds elapse before reaching the vaporization temperature of the gold substantially all of the aluminum will be deposited on the crystal before the gold starts to deposit; and if the temperture is raised quickly the extent of the intermediate zone will be greater. A variable resistor 42 is provided in the circuit to control the heating rate of the gold and aluminum wires 40, 41.

Figure 4 illustrates a slight modification of the device shown in Figure 3. It is to be understood that vacuum establishing equipment similar to that in Figure 3 is utilized with the Figure 4 device. Two filaments 27 are suspended between two pairs of supports 26, 26′ and the gold wires 40 are hung on one filament and the aluminum wires 41 are hung on the other filament. A double pole switch 38′ is provided for selectively connecting one or the other filament 27 to the current supply 37. Thus the aluminum can be entirely deposited on the crystal and then the gold deposited, forming two distinct layers of electrode on the crystal, as illustrated by Figure 1.

Figure 5 illustrates a filament of modified form. It has a number of small "kinks" or "dips" 46 spaced about 2 inches apart. The wires 40 or 41 of material to be evaporated are hung in these little "kinks" so that when they melt due to the heat of the filament the molten material does not run together.

I have found that heating a crystal with a composite electrode will change the appearance of the outside surface of the electrode. For example, if the outside portion of the electrode is predominantly gold it probably will be somewhat gold in color although this may not always be true. If the electrode is heated at about 60 degrees Centigrade the color will change so that it looks more like aluminum. It retains, however, the low contact resistance which is characteristic of a layer which is predominantly gold.

I have also found that burnishing the composite electrode with a soft material such as cheesecloth will improve its appearance and make it stick to the crystal better. Care should be exercised, however, to see that the thin gold layer is not worn away.

While I have described my invention utilizing the best combination which is aluminum and gold, it is to be understood that other metals may also be used. For example, silver, palladium, and platinum may be used in place of gold, and beryllium or magnesium may be used in place of aluminum. When using these other metals in the described apparatus, care must be exercised in the choice of the filament material as it must not evaporate before the small wires of metal to be deposited evaporate, and it should not too readily alloy with the material to be evaporated.

Instead of using small wires of metal to be evaporated it is within the scope of my invention to use a coated filament. For example, a tungsten filament may be coated with gold, aluminum or the like, and when the filament is heated sufficiently the coating will evaporate.

It is also within the scope of my invention to evaporate the metals from one or more crucibles, and this method is preferred where the material to be evaporated too readily alloys with otherwise suitable filament materials.

Although I have described my electrode and method with a certain degree of particularity, it is to be understood that changes may be made without departing from the spirit and scope of my invention as hereinafter claimed.

I claim as my invention:

1. An electrode for a piezoelectric crystal element comprising, a layer of unoxidized aluminum one face of which is in intimate contact with said element, and a layer of gold in intimate contact with the other face of said layer of aluminum.

2. An electrode for a piezoelectric crystal element comprising, a composite layer of two metals, the inner portion of said layer which is in intimate contact with the surface of said crystal element being predominantly of one metal, and said composite layer from the inner portion toward the outer portion thereof becoming progressively richer in said other metal.

3. An electrode as set forth in claim 2, further characterized in this: that said inner portion is predominantly aluminum and said outer portion is predominantly gold.

4. An electrode for a piezoelectric crystal element comprising a composite layer formed of a mixture of gold and unoxidized aluminum, said layer being predominantly unoxidized aluminum at the surface of said crystal element and predominantly gold at its outside surface.

5. An electrode for a piezoelectric crystal element comprising, a composite layer formed of a mixture of gold and aluminum, said layer varying from predominantly aluminum at the surface of said crystal element to predominantly gold at its outside surface.

CHARLES K. GRAVLEY.

REFERENCES CITED

The following references are of record in the file of this patent:

UNITED STATES PATENTS

| Number | Name | Date |
|---|---|---|
| 2,095,376 | Bechmonn | Oct. 12, 1937 |
| 2,204,762 | Mason | June 18, 1940 |
| 2,363,781 | Ferguson | Nov. 28, 1944 |
| 2,426,650 | Sivan | Sept. 2, 1947 |